US008234496B1

(12) United States Patent  (10) Patent No.: US 8,234,496 B1
Ding et al.  (45) Date of Patent: Jul. 31, 2012

(54) IMAGE LEAK PREVENTION USING DIGITAL WATERMARK

(75) Inventors: Changer Ding, Nanjing (CN); John Yang, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 532 days.

(21) Appl. No.: 12/399,180

(22) Filed: Mar. 6, 2009

(51) Int. Cl.
*G06F 21/00* (2006.01)
(52) U.S. Cl. .......... 713/176; 713/161; 713/193
(58) Field of Classification Search .......... 713/161, 713/176, 193
See application file for complete search history.

(56) References Cited

U.S. PATENT DOCUMENTS

| | | | | |
|---|---|---|---|---|
| 5,881,287 | A * | 3/1999 | Mast | 717/127 |
| 6,389,421 | B1 * | 5/2002 | Hawkins et al. | 1/1 |
| 6,980,668 | B1 * | 12/2005 | Naito et al. | 382/100 |
| 7,548,633 | B2 * | 6/2009 | Hayashi | 382/100 |
| 7,703,081 | B1 * | 4/2010 | Buches | 717/127 |
| 2003/0191941 | A1 * | 10/2003 | Terada et al. | 713/176 |
| 2003/0196086 | A1 * | 10/2003 | Murakami et al. | 713/161 |
| 2003/0196093 | A1 * | 10/2003 | Raley et al. | 713/176 |
| 2003/0233564 | A1 * | 12/2003 | LaRose et al. | 713/193 |
| 2004/0001610 | A1 * | 1/2004 | Murakami | 382/100 |
| 2005/0273614 | A1 * | 12/2005 | Ahuja et al. | 713/176 |
| 2006/0168450 | A1 * | 7/2006 | Yagawa | 713/176 |
| 2007/0143603 | A1 * | 6/2007 | Hadden et al. | 713/167 |
| 2008/0215891 | A1 * | 9/2008 | Horne et al. | 713/187 |
| 2008/0301760 | A1 * | 12/2008 | Lim | 726/1 |
| 2009/0327326 | A1 * | 12/2009 | Bahr | 707/102 |

* cited by examiner

*Primary Examiner* — Philip Chea
*Assistant Examiner* — Dorianne Alvarado David
(74) *Attorney, Agent, or Firm* — Beyer Law Group LLP (57) ABSTRACT

Unique digital signatures of sensitive or restricted image files are calculated and stored in a database. A hook routine hooks an open or read command when an application opens an image file in order to check for a restricted digital signature of that image file. If present, a digital watermark is added to the image before the application edits that image. A user may then modify the image. A hook routine also hooks a close or write command in order to check for a digital watermark. If present, the digital watermark is removed and a new digital signature for the revised image is calculated. The digital signature for the revised image is then uploaded to a database associated with a DLP server software product, and then pushed periodically down to endpoint DLP client products.

17 Claims, 7 Drawing Sheets

IMAGE LEAK PREVENTION USING DIGITAL WATERMARK

FIELD OF THE INVENTION

The present invention relates generally to data loss prevention. More specifically, the present invention relates to data loss prevention of images.

BACKGROUND OF THE INVENTION

Information within organizations and entities is often classified as sensitive either for business reasons or for legal reasons. This information may reside within text files, databases, images, pictures, etc. In addition to the potential threat of an unscrupulous party illegally accessing the organization from the outside via an electronic network, and then removing or disrupting the information, there exists the risk of intentional or inadvertent transmission of the sensitive information from inside the organization to the outside. For example, a disgruntled employee might send a sensitive data file to which he or she has access to an outside party via e-mail, thus causing harm to the organization.

In addition to simple business reasons for not wanting sensitive information to be released, i.e., the desire to keep trade secrets secret, many new government regulations mandate controls over information (requiring the sensitive information not to be released outside the company) and companies must comply in view of significant penalties. For example, HIPAA regulates health information, BASEL II regulates financial information, Sarbanes-Oxley regulates corporate governance, and a large number of states have passed data privacy laws requiring organizations to notify consumers if their information is released. Companies are even subject to a regular information technology audit which they can fail if they do not employ suitable controls and standards.

Technology companies have reacted to this environment with a host of data loss prevention (DLP) products. These products are typically hardware/software platforms that monitor and prevent sensitive information from being leaked outside the company. These DLP products are also known as data leak prevention, information leak prevention, etc. Gateway-based DLP products are typically installed at the company's Internet network connection and analyze outgoing network traffic for unauthorized transmission of sensitive information. These products typically generate a unique signature of the sensitive information when stored within the company, and then look for these signatures as information passes out over the network boundary, searching for the signatures of the sensitive information. Host-based DLP products typically run on end-user workstations within the organization. These products can address internal as well as external release of information and can also control information flow between groups of users within an organization. These products can also monitor electronic mail and instant messaging communications and block them before they are sent.

Figure 1:
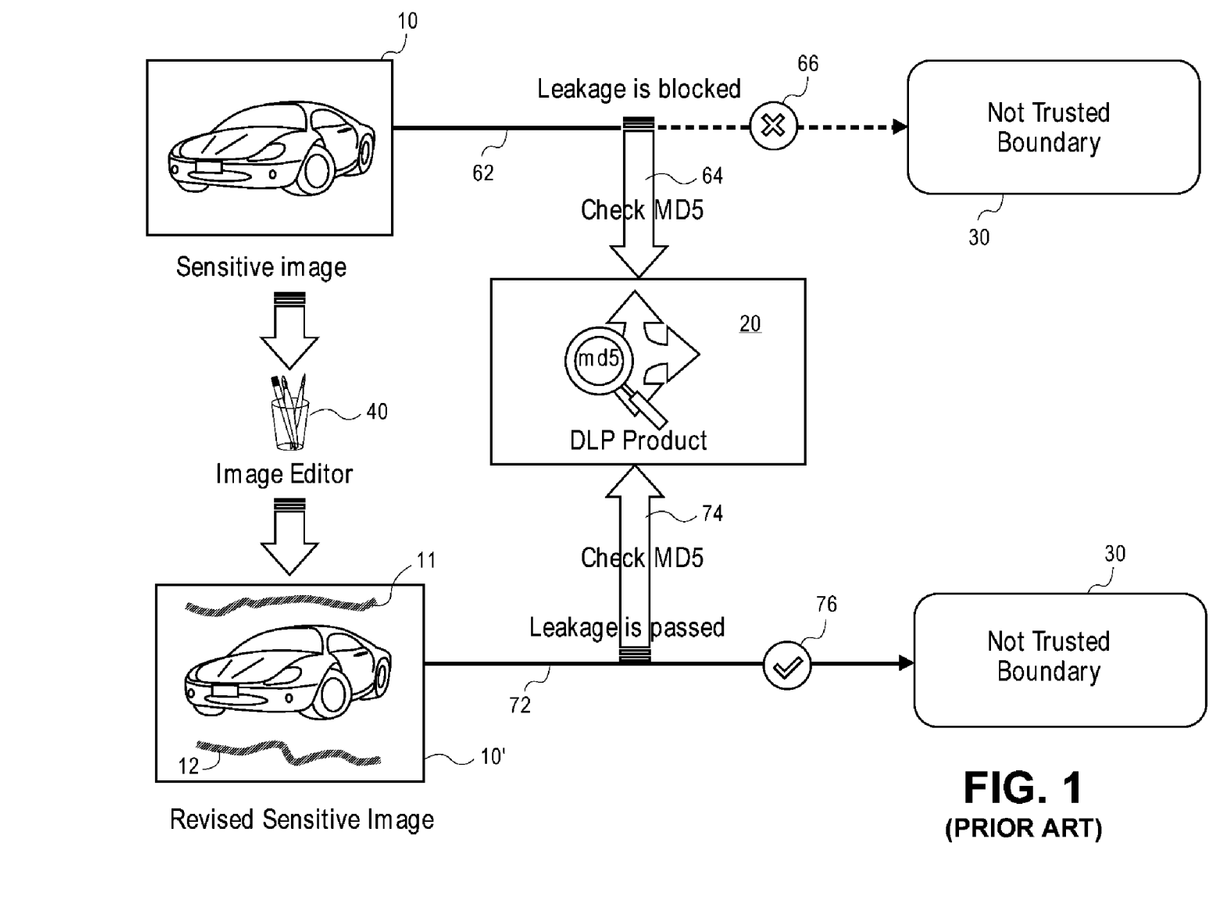
FIG. 1 illustrates a prior art technique.

Detecting and preventing the leaking of sensitive images can be especially problematic. FIG. 1 illustrates a prior art technique. In this example, image 10 is a sensitive image that the company wishes to keep within the company. To that end, it employs a data loss prevention product 20 that has generated a unique signature for this image 10 while the image is stored within the company. For example, any suitable hash function, such as the MD5 algorithm, may be used to generate a unique signature. When the user attempts to send 62 the image outside of the company to an entity 30 outside of the company boundary (that is not trusted) the DLP product 20 automatically generates the signature of the image to be sent and compares it against a list of sensitive image signatures. A check 64 reveals that the signatures match and the image is blocked 66 from being sent.

But, an unscrupulous user may use an image editor 40 to make minor changes 11, 12 to image 10'. Or, the user may simply convert the image to another image format. The user then attempts to leak the image by sending it 72 to an untrusted party 30 outside the company boundary. When the DLP product 20 then checks 74 the signature of the revised image against the list of sensitive image signatures, there is no match because image 10' has a different unique signature than original image 10 because of the modifications. The image is then passed 76 through the company boundary to the untrusted party.

What is desired is an improved technique for preventing the loss of sensitive images.

SUMMARY OF THE INVENTION

To achieve the foregoing, and in accordance with the purpose of the present invention, an image loss prevention technique is disclosed that can trace revisions of sensitive or restricted images.

Data leak prevention software products typically calculate and store the unique digital signature of image files in a database for later reference. The present invention traces revised images by hooking an open command in order to add a digital watermark to the image before an application edits that image, and then also hooks a close command in order to check for that digital watermark and then to calculate a new unique signature for this revised image. The digital watermark is then preferably removed before saving the image, which will make the process transparent to the user. The digital signature for the revised image is then uploaded to a database associated with a DLP server software product, and then pushed periodically down to endpoint DLP client products.

In one embodiment of adding a digital watermark to a file, a DLP product via a software hook module receives an indication that a software application is attempting to open a computer image file stored on disk. A digital signature of the image file is calculated and compared against a sensitive file database. If there is a match, then the image file is copied to a temporary location. A digital watermark is added to the image file that has been copied. The software application is then redirected to read the image (including the watermark) from the temporary location. Any resulting revised image file that the application creates will then necessarily include the added digital watermark.

In a second embodiment of marking a file as being restricted a DLP product via a software hook module receives an indication that an executing software application is attempting to close a computer image file to complete the storing of it from application process memory to disk. The module determines that the image file includes a digital watermark, the existence of this digital watermark indicating that the image file is designated as a restricted file and should not be transmitted outside the organization. The digital watermark is removed from the image file and a digital signature of the image file is calculated. The software application is then allowed to close the image file to complete the storing of the computer image file from the application process memory to disk. The digital signature of the revised image file is then uploaded and stored in a restricted file database of a DLP server before being pushed down to endpoint computers. If the image file had been stored in a temporary location generated by the software hook module, then the image file is stored to its original location on disk.

In a third embodiment of marking a computer file as being restricted, a DLP product hooks an "open file" command from a software application attempting to open a computer image file from disk. The software application is allowed to open and read this image file and may or may not attempt to modify the image. When the application attempts to close (or perhaps write) the modified image, the DLP product hooks a "close file" command from the software application to prevent the direct writing of the image from the application process memory to disk. A digital signature of the modified image is calculated, and the signature is stored in a restricted file database. The software application is then allowed to store this modified image file from application process memory to disk. This modified image file is marked as being restricted by virtue of its calculated digital signature being present in the restricted file database. Any digital watermark present in the image file is preferably removed prior to calculating the digital signature of the modified image.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

An improved data leak prevention product is able to track modified images and prevent these modified images from being leaked outside an organization. A digital watermark is used to facilitate the invention. As known in the art, watermarking embeds recognizable information (the digital watermark) into digital data such as a picture, video frame, image, etc. Even if the digital data is copied, the digital watermark remains with the copy. Watermarking may be invisible or visible. When invisible, the digital watermark cannot be viewed. For example, descriptive information concerning a photograph may be annotated to the photograph for later reference, but cannot be seen in the photograph when viewed. When visible, the digital watermark can be seen on the image itself. Preferably, the present invention uses an invisible watermark.

Figure 2:
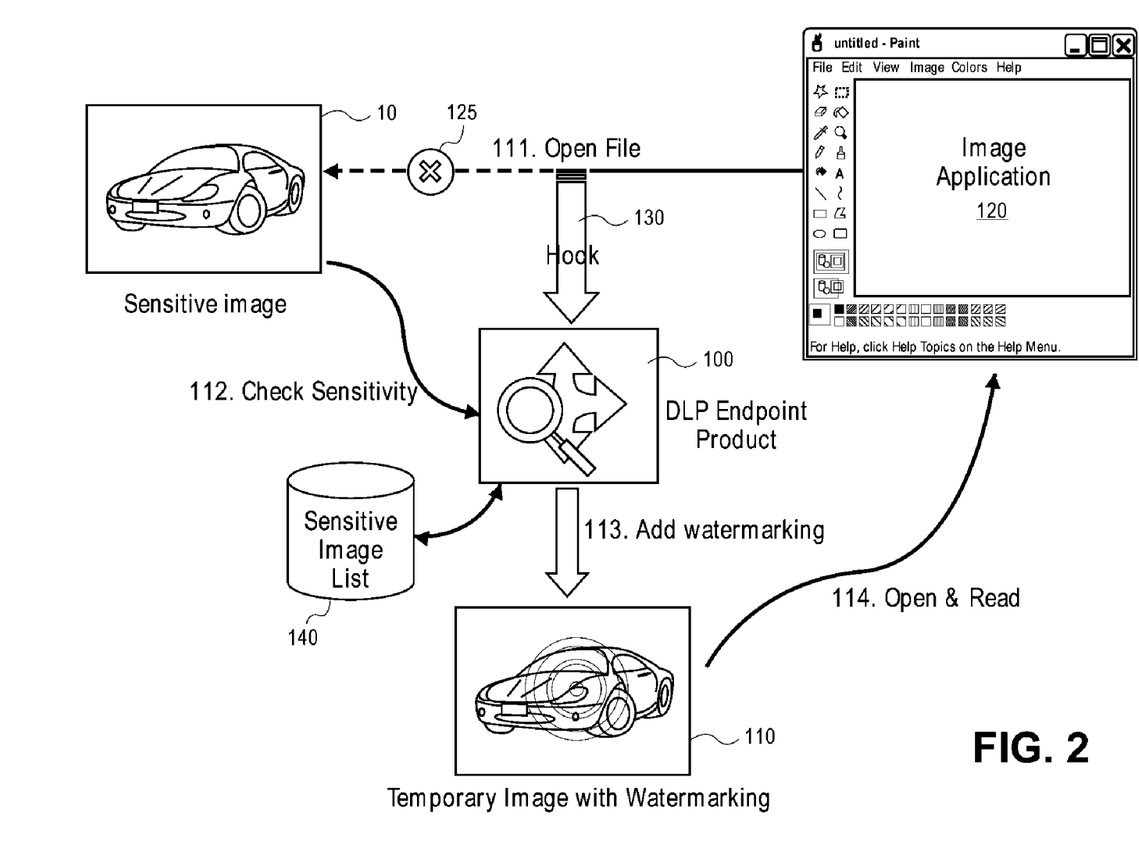
FIG. 2 illustrates a technique for adding a digital watermark to a sensitive image.

FIG. 2 illustrates a technique for adding a digital watermark to a sensitive image. Image 10 is any sensitive image that an organization wishes to protect and not have released outside the organization or outside a designated group within the organization, or simply wishes to track when it is being transmitted. Image 10 may be any digital image, digital photograph, video frame, picture, etc. The image may be in any suitable digital format such as JPEG, PNG, GIF, BMP, TIF/TIFF, MPEG, PSD, PCX, MSV, VOC, MP3, MIDI, etc.

DLP endpoint product 100 is a software module arranged to perform the steps of the present invention described herein and preferably resides and executes on a user computer (an endpoint computer). In one embodiment, product 100 is client software of an enterprise DLP product that also includes server software on a DLP server computer within the enterprise. The server software would then execute steps associated with the server computer as described below. Alternatively, product 100 may reside upon a gateway computer within the organization; in this situation, when the product is installed on a gateway computer, revisions of sensitive or restricted images will be tracked on the gateway computer. In order to prevent any leaking of images through the gateway computer, the DLP product monitors the network and detects leaking of any sensitive files having a watermark.

Product 100 is preferably written in the C or C++ programming languages, but may also be written using languages such as Java, C#, etc. Application 120 is any suitable computer program arranged to open an image file and edit it, and is typically an application that an end user might use to edit a digital image. Examples include photo editing applications, word processing programs, PDF editing applications, PowerPoint, Outlook, etc. Hook 130 is any suitable software hook. As known in the art, a software hook is a relatively small portion of software code that allows an application (such as DLP endpoint product 100) to detect when a certain system command is called (such as an "open file" command) and then execute custom code before, during or after execution of that system command. The custom code execute steps that product 100 wishes to execute every time the system command executes.

Sensitive image list 140 is a database containing digital signatures for images that an organization has deemed as being sensitive. An organization may deem any digital image sensitive because it does not wish the image to be transmitted outside the organization, does not want the image to be transmitted outside a particular group of users, does not wish the image to be moved from a storage location, etc. An image may be marked as sensitive by computing a unique digital signature for the image (such as a hash function, message digest, etc.) and then storing that unique digital signature in database 140 accessible by product 100. Alternatively, product 100 also has the capability to input a list of sensitive images, calculate their digital signatures, and store the signatures within product 100 itself.

Product 100 has created a hook module 130 for the "open file" system command being executed by application 120 when it attempts to open image 10. Symbol 125 indicates that application 120 is effectively blocked from immediately reading image 10 directly into the application. An example of this hook module is:

```
// hook file open
    case FILE OPEN EVENT:
    // Get file path to be opened by application like an image
        editor.
    string imagefilePath=GetFileToOpen( );
    // Check if the image file is sensitive by use of MD5.
    if CheckImageSensitivityByMD5(imagefilePath)
    {
        // Create a internal temporary image file.
        string  temporaryImageFile=copyImagefile(imagefile-
            Path);
        // Add watermark into the temporary file.
        AddWalternarkIntoImageFile(temporaryImageFile);
        // Return handler of temporary image file to application.
        return GetTemporaryHandle(temporaryImageFile);
    }
```

When "open file" is called in step 111, the hook module then executes custom code in step 112 to determine if the image about to be opened is considered a sensitive image by the organization. For example, product 100 calculates the MD5 for image 10 and compares it against the list of sensitive images in database 140. If the image signature is not in the database, then no further processing is necessary. On the other hand, if the image has been registered as sensitive, product 100 then creates a temporary image file, adds a watermark, and then returns the temporary file to the application. The product may also execute a similar hook module for a "read file" system command executed by application 120 when it attempts to read image 10. As used herein, the term "open file" or "open" includes reading a file.

As mentioned above, the hook module executes custom code in step 113 and dynamically adds a digital watermark to the image 110 in a temporary disk location. Adding a watermark to the image while in a temporary location may be implemented in many ways. In one embodiment, kernel memory associated with product 100 is used as the temporary location. In another embodiment, a temporary file may be created using the hook module to store the image and its added watermark, and then the read operation of application 120 is redirected to this temporary file. Other techniques may also be used.

Adding a digital watermark to a computer file is well known to those of skill in the art. As known, one technique converts the image using a special algorithm (a digital image processing algorithm) and perhaps adds information as well. Preferably, the digital watermark used is a robust, invisible watermark that uses one of many common algorithms. The algorithm should be strong enough so that the digital watermark cannot be changed by editing. Examples of watermark algorithms that may be used include DCT Watermarking or Wavelet Watermarking.

Because the watermark is added upon opening the image, the watermark could be seen by the user it if it is a visible watermark. Alternatively, if a visible watermark is used and it is not possible for the user to modify or remove the visible watermark when editing the file, then a visible watermark would be suitable for use with his invention. Preferably, the watermark used to trace the revised version when the user edits the image file is temporary, and will be removed when the revision is completed. In this embodiment, nothing is added to the revised image file stored on disk, the reason being that the user may be concerned if something like a watermark is added to his or her image file.

In one embodiment, the same processing algorithm is used for all image files to which a digital watermark is added. In this fashion, the invention can remove the watermark when the image is eventually written because it knows ahead of time which algorithm was used to put the watermark in place. Alternatively, if a different, custom or special algorithm is used for each image file, it would be necessary to flag in some fashion in the image file which algorithm has been used. For example, the name of the algorithm may be embedded within the added watermark.

When application 120 attempts to read image 10 in step 114, product 100 transfers image 110 (residing in a temporary disk location and including the digital watermark) to the application. The user now has opened image 110 in his or her preferred image editing application 120 without realizing that this image includes an unseen digital watermark added to the original image 10.

Figure 3:
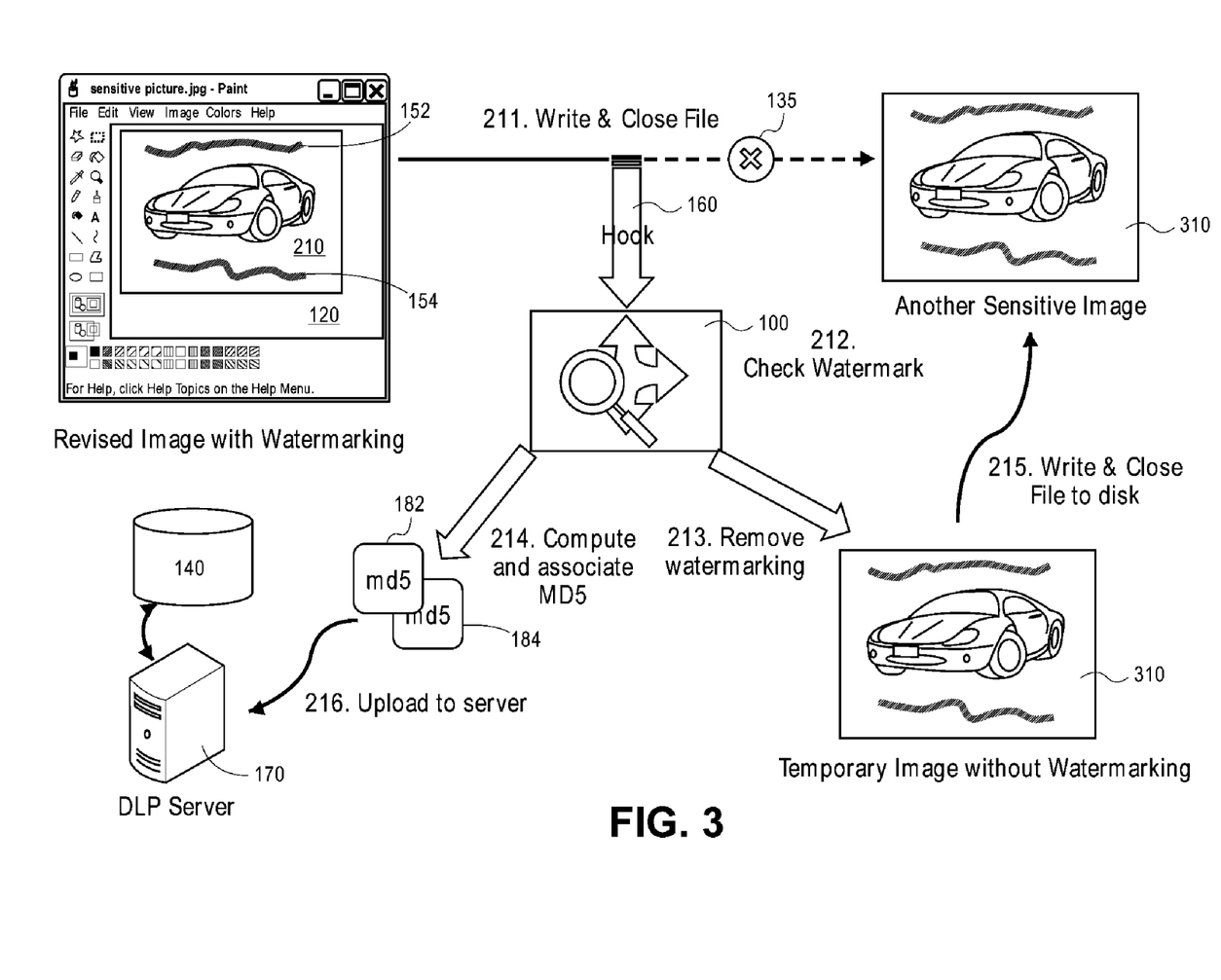
FIG. 3 illustrates registering the revised sensitive image.

FIG. 3 illustrates registering the revised sensitive image. The end user has revised image 110 to create image 210. Hook module 160 hooks the "close file" command. DLP server 170 is any suitable computer server incorporating the DLP enterprise server software and is arranged to be in communication with database 140 that contains the list of sensitive images. As shown, database 140 is within server 170, or may be directly accessible to product 100 as shown in FIG. 2. Preferably, server 170 is within the organization and is accessible by any number of end-user computers that may be executing endpoint product 100.

The user using application 120 had edited image 110 (either with an intent to circumvent the DLP product or innocently) and makes a change or changes to produce a revised image 210 that includes user changes 152 and 154 as well as the invisible digital watermark. Product 100 has created hook module 160 for the "close file" system command being executed by application 120 when it attempts to close image 210 to complete writing it to disk on the user's local computer (or to another storage location chosen by the user). Symbol 135 indicates that application 120 is effectively blocked (via the hook module) from immediately closing image 210 to complete writing it directly to storage. An example of this hook module 160 is:

```
// hook file close
    case FILE CLOSE EVENT:
    // Get the file handler from the application that is going to
        close the file.
    HANDLE handle=GetHandleToWrite( );
    // Check if the file to be closed includes watermark added
        by product.
    if CheckdWalternarkInImageFile(handle)
    {
        // Get image file path from the handle.
        string filePath=getFilePath(handle);
        // Remove the watermark from the image file.
        RemoveWalternarkFromImageFile(filePath);
        // Compute the new MD5 of the new image file.
        string md5of NewImageFile=
        ComputeMD5OfFile(filePath)
        // Store and report the new MD5 of revised or newly
            created sensitive image file.
        StoreAndReportNewMd5(md5ofNewImageFile);
    }
    // check if the image file is a internal temporary file
    // if true, its a modified version from a sensitive image file
    // if false, its new created sensitive image file if Internal-
        TemporaryFileHandle(handle)
    {
        // copy the internal temporary file to original place
        string originalImageFile=
        GetOriginalImageFilePath(handle);
        MoveImageFile(newFilePath, originalImageFile);
    }
    // close the file handle
    CloseFileHandle(handle);
```

The product may also execute a similar hook module for a "write file" system command executed by application 120 when it attempts to write image 10. As used herein, the term "close file" or "close" includes writing a file.

When "close file" is called in step 211, the hook module then executes custom code in step 212 to determine if revised image 210 about to be written includes the digital watermark added to the image previously. Preferably, product 100 adds the same digital watermark (using the same algorithm) to each image that is about to be opened and read by an application in step 113, thus making it simpler to determine if any image about to be written includes the digital watermark. Alternatively, each image may have a different or unique digital watermark added to it and product 100 would then record an indication of which watermark has been embedded in which image. Step 212 would then involve determining which watermark to look for in which image, and then looking for that watermark. Product 100 would then keep track in an internal database which watermarking algorithm has been used with which image.

If the revised image about to be closed does not include the digital watermark this indicates that the image was not previously designated a sensitive image and no further processing is necessary. The image may then be written and the file closed. But, if the digital watermark is found, in step 213 the digital watermark is removed from image 210 to produce image 310 which is stored in a temporary location. Once the watermark is removed, then the image 310 is moved back to its original location. It is preferable to remove the digital watermark before computing the unique signature of the revised image. The watermark currently only exists in the process of the application that has opened the image. One reason to remove the watermark is that it is desirable to only store the user's changes to the image on disk; another reason is to prevent anyone from discovering the watermark used.

Next, in step 214 product 100 computes the unique signature 182 (such as an MD5) of revised image 310 (without the watermark) and saves this unique signature in sensitive image list database 140. Because original image 10 is considered sensitive, it is likely that revised image 310 is sensitive as well and its unique signature should be kept in the sensitive image list. In addition, the signature 182 of the revised image may also be associated with signature 184 of the original image 10 and these two signatures may be stored together in database 140.

For example, the signatures may be associated by being stored together in a linked list, by being stored in fields of the same record, etc. By storing the signatures of similar images together, product 100 is able to provide advantages in the administration of the DLP product.

For example, if the signature of a revised image is associated with the signature of the original image in the database, then the same policy or rules used with the original image may also be used with the revised image, thus providing a more consistent policy and saving time. In addition, if the revised image is flagged or blocked, it can be useful to review the history of the original image to provide more information to the administrator.

In one embodiment, these two signatures are uploaded from the end-user computer to the server 170 and then stored in database 140. In one embodiment, the unique signature of the original image is incorporated into the digital watermark that is added to the image when it is opened. Thus, the DLP product is aware of the signature of the original image when it removes the watermark from the revised image and calculates the new unique signature. In this way, the two signatures can be associated with one another when added to the database.

Next, in step 215, revised image 310 (including the user's changes but not including the watermark) is written to disk and the image file is closed. Thus, the original image has been revised by the user, and because the revised image 310 is also considered sensitive, the revised image has had its unique signature registered with the DLP server in the sensitive list.

Figure 4:
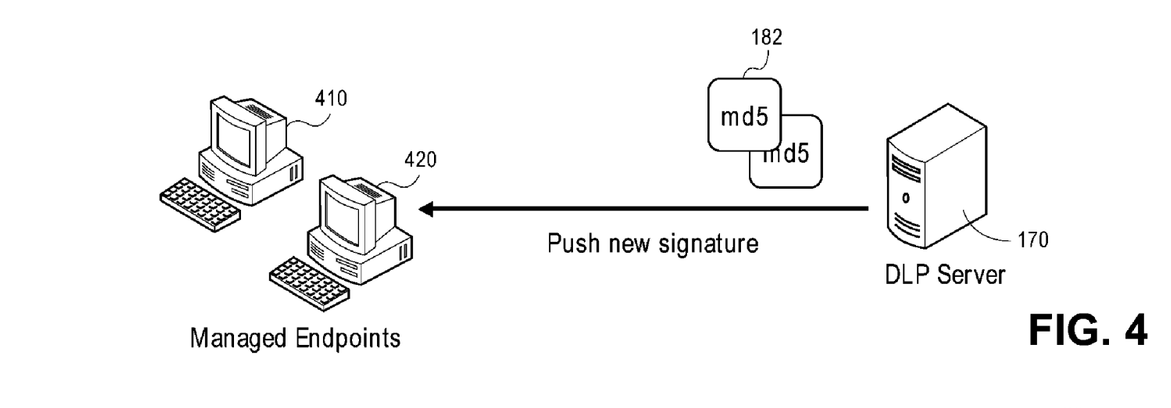
FIG. 4 illustrates distribution of new signatures to managed endpoint computers.

FIG. 4 illustrates distribution of new signatures to managed endpoint computers. Once DLP server 170 receives the unique signature of the revised image (or periodically) it pushes this unique signature down to other products 100 running a user computers 410 and 420 in order to prevent the revised image from being transmitted outside the organization by these computers. The server may push the signatures to the end-user computers immediately upon receiving a newly calculated signature for a revised image, or may push a group of new signatures down to the computers periodically, such as daily or weekly. In this fashion, each user computer (such as 410 or 420) is apprised of all digital signatures that represent the sensitive images that the organization does not wish to be released.

Figure 5:
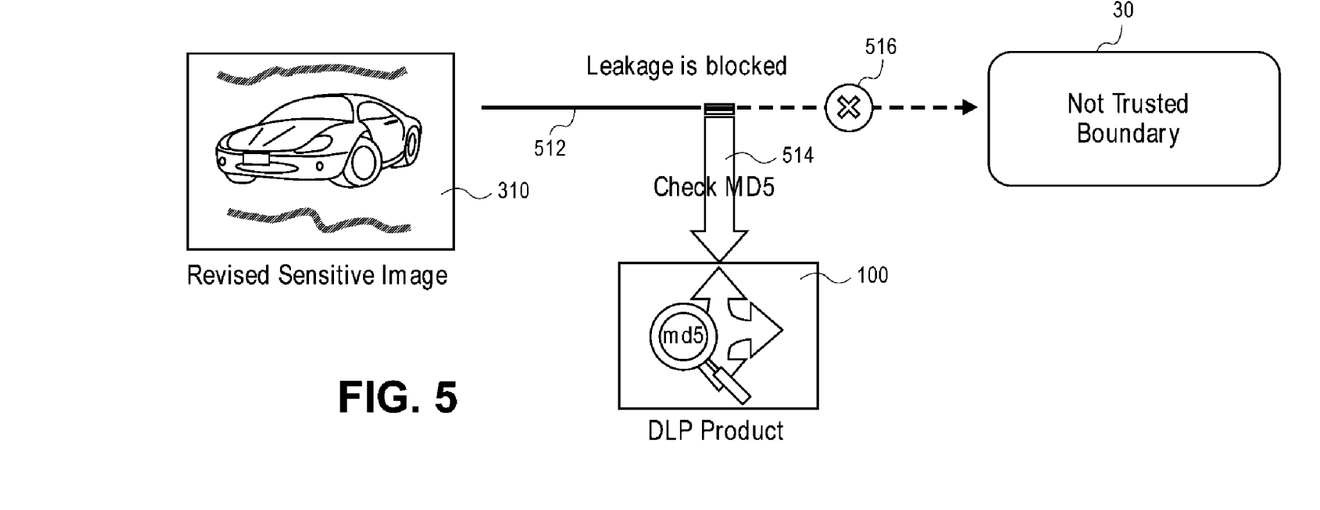
FIG. 5 illustrates blocking a sensitive image from being released.

FIG. 5 illustrates blocking a sensitive image from being released. In this example, a user operates an endpoint computer upon which is running DLP product 100. The user has previously created a revised sensitive image 310 that is based upon sensitive image 10. Under the prior art, the revised image would be released because product 100 has no record of the unique signature of this revised image. Under the present invention, the unique signature of image 310 has previously been calculated, uploaded to the server 170 and then downloaded to all user endpoints computers within the organization. Accordingly, in step 512 when the user attempts to transmit image 310 outside of the organization, product 100 calculates the signature of this image, compares the signature against the sensitive image list in step 514, determines that the signature is in the list, and then blocks 516 leakage of this image because the image is sensitive.

Flow Diagram

Figure 6A:
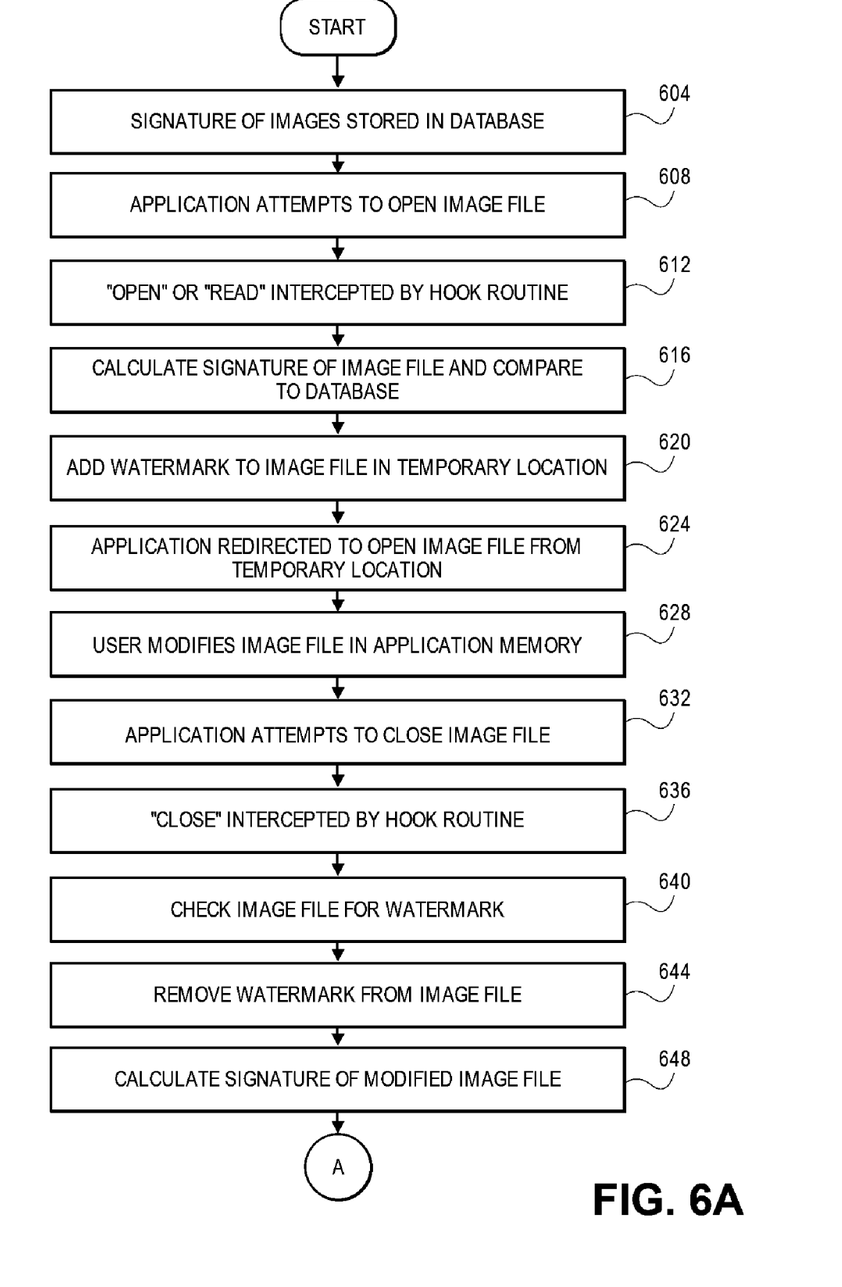
FIGS. 6A and 6B are a flow diagram for one embodiment of the invention.
Figure 6B:
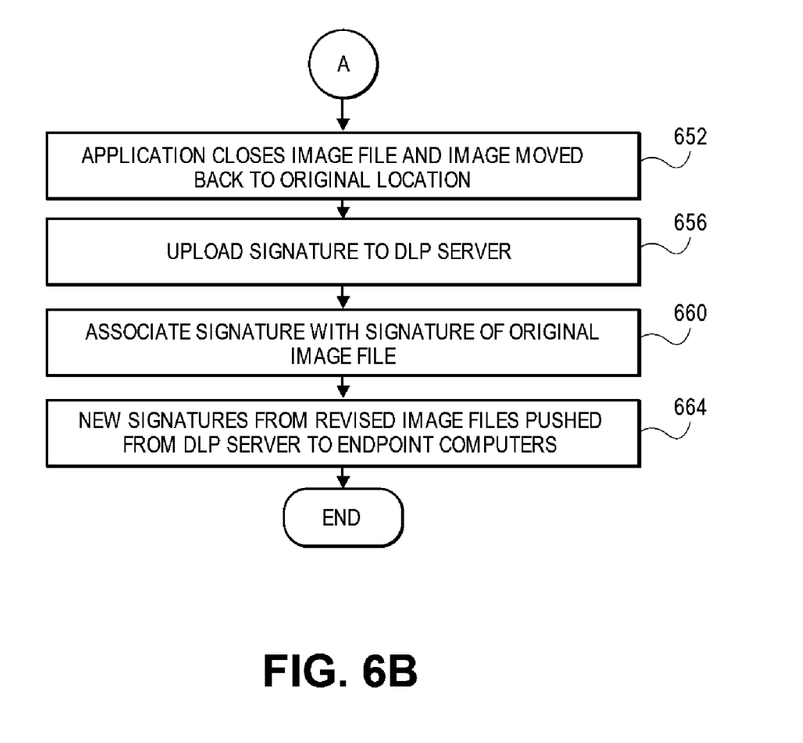

FIGS. 6A and 6B are a flow diagram for one embodiment of the invention. In step 604 the unique signatures of sensitive images stored within a computer network are calculated and stored in database 140. These signatures may be calculated using any suitable algorithm, may be calculated by any suitable software product, and the whole process may be performed as is desired by the organization. For example, the DLP server software may calculate the MD5 for each sensitive image. The organization preferably identifies a priori which image is sensitive and should be flagged. In addition, the DLP product 100 is installed at each endpoint computer along with the hook modules described above.

In step 608 application 120 attempts to open image file 10 using a suitable application programming interface (API). In step 612 this open system command is intercepted by the corresponding hook module (in the operating system kernel) and the hook module then executes the following steps before allowing the application to actually open the image and have it edited. In step 616 the unique signature of the image file is calculated and compared to the list of sensitive image signatures in database 140. If the signature is not found in the database then no further action is taken by the hook module and the application is allowed to open the image file. But, if the signature is found, this means that the image is sensitive and in step 620 a digital watermark is added to the image which is copied to the DLP product temporary location. Optionally, this signature is incorporated into the digital watermark that is added, allowing signatures to be associated together as explained below in step 660.

In step 624 the application is then redirected and allowed to open and read the image file from the temporary location (that includes the digital watermark) rather than directly from the original location on disk. In one embodiment, the application is provided the contents of the image file in temporary memory buffer-by-buffer as it requests the contents of the image. In step 628, the image is now present in the process memory of the application (after being copied buffer-by-buffer from the DLP process memory) and the user is allowed to modify the image.

In step 632 the application attempts to close the image file after the user edits. It is desirable at this point to determine if the image is a sensitive image, and if so, to calculate a new unique signature for this revised image. Accordingly, in step 636 the close system command is intercepted by a suitable hook routine (by hooking the API call) and the following steps are executed by the hook routine before the application is actually allowed to close the image file and write it to disk. In step 640 the revised image is checked to see if it includes a digital watermark. Because it is known ahead of time which algorithm has been used to add any digital watermark, it is straightforward to determine if such a watermark has been added. If none is present, then no further action is taken and the image may be written to disk. If a watermark is present, then in step 644 this watermark is removed and in step 648 a new signature is calculated for this revised image file.

In step 652 the application is then allowed to close the revised image file and the image file is copied back to its original location. In step 656 the newly calculated signature for the revised image is uploaded from the endpoint computer to DLP server 170 and stored in the sensitive image database 140. Thus, the revised image is now also flagged as a sensitive image so it cannot be leaked from the organization.

Optionally, in step 660 this new signature is associated with the signature of the original image file and these two signatures are stored in the database together, or in some fashion indicating that they are associated or linked. In one embodiment, the signature of the original image file is retrieved from a digital watermark that has been removed from the revised image file in step 644 (this signature being present in the digital watermark because it was added in step 620). The two signatures may then be uploaded together to the DLP server and stored in association in the database.

In step 664 (as shown in FIG. 4) the new signature (or any new signatures) are pushed from DLP server 170 down to any of the managed endpoint user computers 410 and 420 and stored in a local sensitive image database associated with these user computers. Depending upon the implementation of the enterprise product and the needs of the organization, a newly calculated signature from step 648 may be pushed down to the endpoints immediately, or a batch of newly calculated signatures for revised images may be pushed periodically such as every hour, every day, every week, etc. Thus, the endpoint user computers incorporating DLP product 100 may effectively check the unique signature of any image file attempted to be transmitted against the local database to determine if the transmission should be blocked or not. The present invention thus prevents the transmission of sensitive image files and any image files that have been revised.

Computer System Embodiment

Figure 7A:
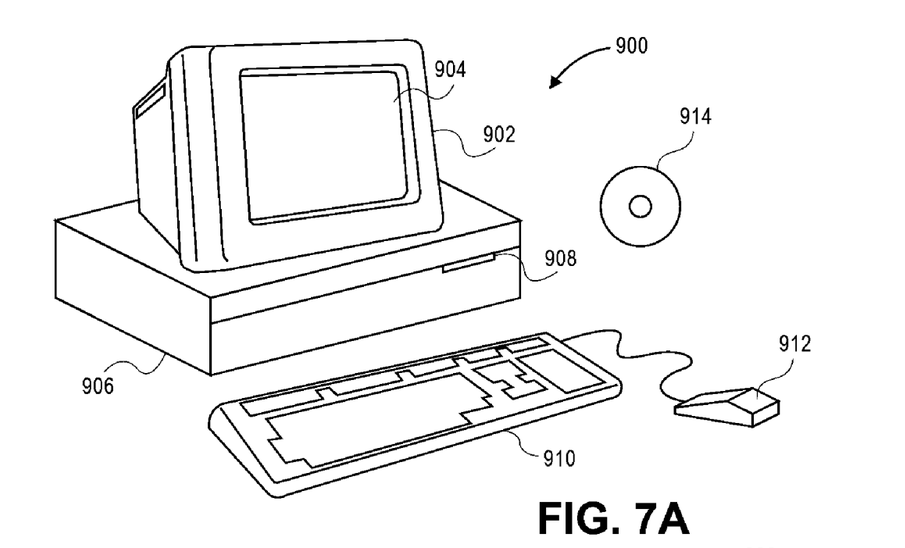
FIGS. 7A and 7B illustrate a computer system suitable for implementing embodiments of the present invention.
Figure 7B:
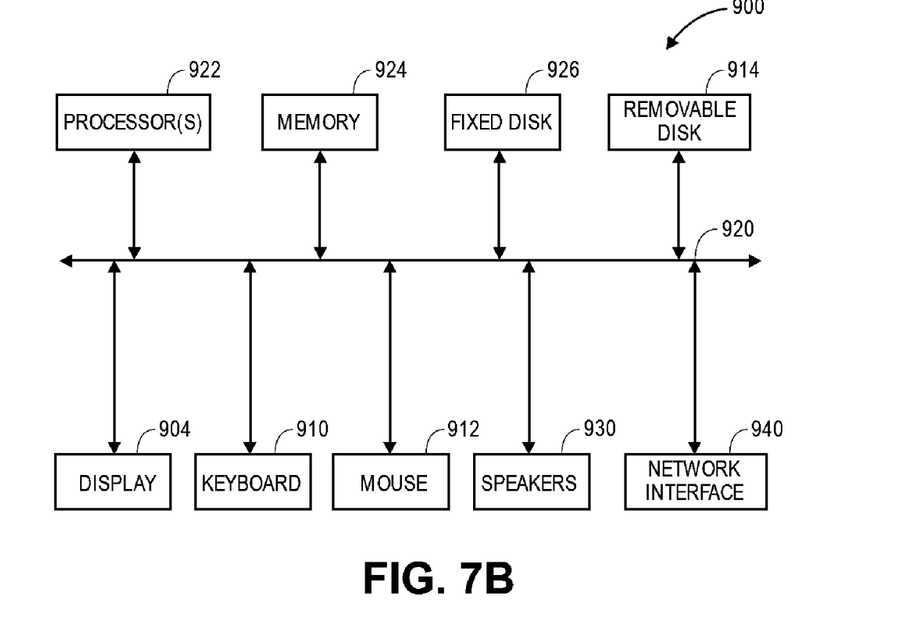

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of adding a digital watermark to a file, said method comprising:

receiving an indication that a software application is attempting to open a computer image file stored on disk by intercepting a system command using a software hook routine that prevents said software application from reading said computer image file directly from said disk;

calculating a digital signature of said image file;

determining that said calculated digital signature matches a stored digital signature in a sensitive file database;

storing said image file in a temporary memory location;

adding said digital watermark to said image file in said temporary memory location by said software hook routine;

transferring said image file including said digital watermark from said temporary memory location to process memory of said software application, thereby allowing said software application to read said image file that includes said digital watermark.

2. A method as recited in claim 1 wherein said digital watermark is invisible to said user when viewing said computer image in said software application.

3. A method as recited in claim 1 wherein the presence of said calculated digital signature in said sensitive file database indicates that a restriction has been placed upon any transmission of said image file.

4. A method as recited in claim 1 further comprising:

executing said steps of claim 1 on an endpoint computer within an organization.

5. A method as recited in claim 1 further comprising:

incorporating said calculated digital signature into said digital watermark that is added to said image file in said temporary memory location.

6. A method as recited in claim 1 further comprising:

adding a digital watermark using a predetermined watermark algorithm.

7. A method of marking a file as being restricted, said method comprising:

receiving an indication that an executing software application is attempting to store an open computer image file from application process memory of said software application to disk by intercepting a system command using a software hook routine that prevents said software application from writing said open computer image file directly to said disk;

determining that said image file includes a digital watermark, the existence of said digital watermark indicating that said image file is designated as a restricted file;

removing said digital watermark from said image file in said application process memory by said software hook routine;

calculating a digital signature of said image file after removal of said digital watermark;

storing said calculated digital signature in a restricted file database; and allowing said software application to store said image file from said application process memory to disk after removal of said digital watermark, whereby said software application writes said image file after the calculation of said digital signature.

8. A method as recited in claim 7 wherein said digital watermark is invisible to a user viewing said image file.

9. A method as recited in claim 7 wherein the presence of said digital watermark in said image file indicates that a restriction has been placed upon any transmission of said image file.

10. A method as recited in claim 7 further comprising:

executing said steps of claim 8 on an endpoint computer within an organization.

11. A method as recited in claim 7 further comprising:

determining that said image file includes a digital watermark by reference to a predetermined watermark algorithm.

12. A method as recited in claim 7 further comprising:

retrieving from said digital watermark an original digital signature representing an original computer image file, said original computer image file being a previous version of said computer image file.

13. A method of marking a computer file as being restricted, said method comprising:

hooking an "open file" command from a software application attempting to open a first computer image file from disk;

allowing said software application to read said first image file from a temporary memory location;

hooking a "close file" command from said software application attempting to write a second computer image file from application process memory to disk, said second image file being a revised version of said first image file;

determining that said second image file includes a digital watermark, the existence of said digital watermark indicating that said second image file is designated as a restricted file;

removing said digital watermark from said second image file in said application process memory before said calculating and said storing;

calculating a digital signature of said second image file;

storing said calculated digital signature of said second image file in a restricted file database; and allowing said software application to write said second image file from said application process memory to disk, whereby said second image file is marked as being restricted by virtue of said calculated digital signature being present in said restricted file database.

14. A method as recited in claim 13 further comprising:

adding a digital watermark to said first image file and storing said first image file in said temporary memory location.

15. A method as recited in claim 13 wherein said hooking of said "close file" command prevents said software application from writing said second image file directly to said disk, wherein said calculating and storing steps are performed after said hooking a "close file" command, and wherein said allowing said software application to write is performed after said step of storing.

16. A method as recited in claim 14 wherein said digital watermark is a visible watermark.

17. A method as recited in claim 13 further comprising:

distributing said calculated digital signature of said second image file to a plurality of endpoint user computers within an organization.

* * * * *

UNITED STATES PATENT AND TRADEMARK OFFICE
CERTIFICATE OF CORRECTION

| | | |
|---|---|---|
| PATENT NO. | : 8,234,496 B1 | Page 1 of 1 |
| APPLICATION NO. | : 12/399180 | |
| DATED | : July 31, 2012 | |
| INVENTOR(S) | : Ding et al. | |

It is certified that error appears in the above-identified patent and that said Letters Patent is hereby corrected as shown below:

IN THE CLAIMS:

Column 12, in claim 10, line 6: Change "claim 8" to --claim 7--.

Signed and Sealed this
Eleventh Day of December, 2012

David J. Kappos
*Director of the United States Patent and Trademark Office*